United States Patent
Karam (10) Patent No.: US 7,593,487 B2
(45) Date of Patent: Sep. 22, 2009

(54) NON-REDUNDANT DIFFERENTIAL MSK DEMODULATOR WITH DOUBLE ERROR CORRECTION CAPABILITY

(75) Inventor: Mostafa A. Karam, Moorpark, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 572 days.

(21) Appl. No.: 11/510,054

(22) Filed: Aug. 25, 2006

(65) Prior Publication Data

US 2008/0049876 A1  Feb. 28, 2008

(51) Int. Cl.
    *H03D 1/00* (2006.01)
(52) U.S. Cl. ....................... 375/336; 329/300
(58) Field of Classification Search ............ 375/274, 375/336; 329/300, 301, 303; 714/785
    See application file for complete search history.

(56) References Cited

U.S. PATENT DOCUMENTS

| 5,963,585 | A | * | 10/1999 | Omura et al. | ............ | 375/150 |
| 6,934,317 | B1 | * | 8/2005 | Dent | ............ | 375/140 |
| 2001/0022532 | A1 | * | 9/2001 | Dolman | ............ | 330/149 |

* cited by examiner

*Primary Examiner*—Don N Vo (57) ABSTRACT

A non-redundant differential MSK demodulator with double-error correction capability includes a differential detection stage, an error signal generator stage, and an error detection-and-correction stage. Differential detectors receive modulated MSK input. The error signal generator converts outputs from the differential detectors into orthogonal error signals. The error detection-and-correction stage compares an algebraic sum of the error signals to a threshold value and outputs a correction value based thereon. The correction value is added to output from the differential detection stage to produce demodulated MSK output.

20 Claims, 6 Drawing Sheets

| Signals | $S(t_{i-6})$ | $S(t_{i-5})$ | $S(t_{i-4})$ | $S(t_{i-3})$ | $S(t_{i-2})$ | $S(t_{i-1})$ | $S(t_i)$ |
|---|---|---|---|---|---|---|---|
| 1st order detector | | | $Ref_{1(i-3)}$ | $Sig_{1(i-3)}$ $Ref_{1(i-2)}$ | $Sig_{1(i-2)}$ | | |
| 2nd order detector | | $Ref_{2(i-3)}$ | | $Sig_{2(i-3)}$ $Ref_{2(i-1)}$ | | $Sig_{2(i-1)}$ | |
| 3rd order detector | $Ref_{3(i-3)}$ | | | $Sig_{3(i-3)}$ $Ref_{3i}$ | | | $Sig_{3i}$ |
| 1st order detector | | | $Sig_{1(i-3)}$ | $Ref_{1(i-3)}$ $Ref_{1(i-2)}$ | $Sig_{1(i-2)}$ | | |
| 2nd order detector | | $Sig_{2(i-3)}$ | | $Ref_{2(i-3)}$ $Ref_{2(i-1)}$ | | $Sig_{2(i-1)}$ | |
| 3rd order detector | $Sig_{3(i-3)}$ | | | $Ref_{3(i-3)}$ $Ref_{3i}$ | | | $Sig_{3i}$ |

FIG. 6

| Number of Errors in Input | Number of Remaining Errors in Output | Number of Patterns | Total Number of Remaining Errors |
|---|---|---|---|
| 1 | 0 | 6 | 0 |
| 2 | 0 | 15 | 0 |
| 3 | 0 | 9 | 20 |
| | 1 | 2 | |
| | 2 | 9 | |
| 4 | 2 | 15 | 30 |
| 5 | 2 | 6 | 12 |
| 6 | 2 | 1 | 2 |

(a) Conventional Demodulator
(b) Non-Redundant Single-Error Correcting Demodulator
(c) Present Demodulator § NON-REDUNDANT DIFFERENTIAL MSK DEMODULATOR WITH DOUBLE ERROR CORRECTION CAPABILITY

BACKGROUND OF THE INVENTION

1. Field of the Invention

The present invention relates to a differential minimum shift keying (DMSK) demodulator. More specifically, the invention relates to a DMSK demodulator having non-redundant double error correction capability.

2. Description of Related Art

Minimum-shift keying (MSK) signals have been widely applied to nonlinear and power limited communication systems such as satellite communication systems, mobile communication systems, IFF communication systems, and others. The widespread use of MSK is due to a significant property of MSK signals that the envelope of the signals is constant and suffers little degradation from nonlinear systems. MSK signals can be demodulated by either coherent demodulators or differential demodulators. Differential demodulators are very attractive because they require simpler circuit configurations and they do not require carrier recovery. However, the bit error rate (BER) performance for differential demodulators is inferior to that for coherent demodulators.

Non-redundant error correction demodulators have been designed to improve BER performance for DMSK signals. Unlike other demodulators that use error correcting codes such as Reed-Solomon Code, the non-redundant error correcting demodulators do not use additional redundant bits. Non-redundant error-correcting demodulators utilize the outputs of higher orders (multi-bit) of differential detectors along with the output of a conventional first order (single-bit) differential detector. The outputs of the first order differential detector provide the modulated MSK digital signals. The outputs of higher order detectors may be used as a parity check sum for the outputs of the first order detector. For instance, in the absence of errors, a bit detected by a second order differential detector is equal to modulo-2 sum of two consecutive bits detected by the first order differential detector, and a bit detected by a third order differential detector is equal to modulo-2 sum of three consecutive bits detected by the first order differential detector, and so on.

U.S. Pat. No. 4,128,828 discloses a DMSK demodulator with non-redundant single-error correcting capability that utilizes the outputs of a second order differential detector and a first order, single-bit, "conventional" differential detector. This demodulator has been shown to improve BER performance by more than 1 dB. See, e.g. T. Masamura, et al., "Differential Detection of MSK with Nonredundant Error Correction," IEEE Trans. Communications, COM-27, June 1979; and H. Weining, "Performance Analysis and Improved Detection for DMSK with Non-redundant Error Correction," IEEE Proceedings I, Volume 137, Issue 6, December 1990.

An additional improvement of about 0.5 dB has been gained through the use of a double-error correcting DMSK demodulator, proposed by T. Masamura, "Intersymbol Interference Reduction for Differential MSK by Nonredundant Error Correction," IEEE Transactions on Vehicular Technology, Vol. 9, No. 1, February 1990 (hereinafter the "Masamura demodulator"). The operation of the Masamura double-error correcting demodulator is based on four stages: (i) a differential detector stage, (ii) a syndrome generator stage, (iii) a syndrome register stage, and (iv) a pattern detector stage.

In the differential detector stage, the Masamura demodulator uses three differential detectors: a first order differential detector, a second order differential detector, and a third order differential detector.

In the syndrome generator stage, the outputs of the three detectors are coupled through Exclusive-OR (XOR) gates to form a pair of syndrome values, which is delivered to the syndrome register. The register outputs to the pattern detector a syndrome pattern matrix consisting of the syndrome pair and two other syndrome pairs associated with the two preceding consecutive time intervals (bits). The pattern detector compares the syndrome pattern against nine sorted patterns to determine if there is an erroneous bit. There are 64 possible syndrome patterns that may be delivered by the syndrome register. The output of the pattern detector is added to the output of the first order differential detector delayed by two bit intervals to correct the received data. This means that at the end of the demodulation process, two bits are left without correction. Also, the output of the pattern detector must be delivered back to the syndrome register to correct for some delayed syndrome values.

The shortcomings of the Masamura double-error correcting DMSK demodulator reside in the syndrome register and in the pattern detector. In the syndrome register, a syndrome pair should ideally be used over three consecutive time intervals. This may lead to the propagation of higher order errors, despite the use of Exclusive-OR gates in the register for eliminating the single and double errors.

Moreover, in the pattern detector, a system memory is required to store the nine error patterns. Each pattern has a length of six elements (or bits). Furthermore, the process of detecting the nine error patterns from the 64 possible syndrome patterns is time consuming and may not yield accurate results. This is because those patterns are not orthogonal to the error being detected, and they do not have any other criteria characterizing them to facilitate the error detection process.

Pattern detection has been replaced with a threshold detector in a DMSK demodulator proposed by Y. Han et al., "DMSK System with Nonredundant Error Correction Capability," IEEE GLOBECOM-91, 1991. However, this demodulator uses the outputs of a sixth order differential detector. Reliance on output of such high order detector creates more uncertainty at the outset of the demodulation process, and leaves five uncorrected bits at the end of the process rather than two.

The present invention provides a design for a double-error correcting DMSK demodulator that overcomes the shortcomings of double-error correcting DMSK demodulators such as the Masamura demodulator.

SUMMARY OF THE INVENTION

A demodulator according to the present invention includes a differential detection stage, an error signal generator stage, an error detection-and-correction (EDAC) stage, and an output stage. The differential detection stage receives modulated MSK input, which may be applied as a common input signal to each of a plurality of differential detectors. In one embodiment, these include a first order differential detector, a second order differential detector, and a third order differential detector. In the error signal generator stage, three syndrome pairs are derived from the output of the differential detection stage, and, using appropriate logic, the error signal generator converts the three syndrome pairs into orthogonal error signals. In one embodiment, four such orthogonal signals are output from the error signal generator stage to the EDAC stage. The four orthogonal error signals may be generated directly from the outputs of the three differential detectors to reduce the probability of error propagation. The EDAC stage sums the orthogonal error signals and compares the sum to a threshold value. Based on the comparison, the EDAC outputs a correction value. In the comparison, if the sum exceeds the threshold value, the EDAC stage outputs a correction value in the form of a binary one, otherwise the EDAC stage outputs a binary zero as the correction value. At the output stage, the correction value is added to delayed output from the differential detection stage to produce a demodulated MSK output. The demodulated MSK output is fed back to the error signal generator stage to complete generation of one or more of the error signals.

By deriving orthogonal error signals, a demodulator according to the present invention ensures that any erroneous bits appear only once among all the error signals. This allows the EDAC threshold detector to detect, and correct for erroneous bits without having to employ complex pattern detection processes and suffer associated time requirements, memory requirements, and uncertainties.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. The invention will be better understood upon consideration of the specification and the accompanying drawings, in which like reference numerals designate like parts throughout the figures, and wherein:

DESCRIPTION OF THE PREFERRED EMBODIMENTS

An objective of the present invention to provide a novel non-redundant DMSK demodulator with double-error correcting capability that overcomes the shortcomings of existing demodulators, as delineated above in the Background discussion. A demodulator according to the present invention includes an error signal generator and an error detection-and-correction (EDAC) unit. The error signal generator may operate in place of the syndrome generator and syndrome register of prior demodulators. The EDAC unit may operate in place of the pattern detector of prior demodulators.

Figure 1:
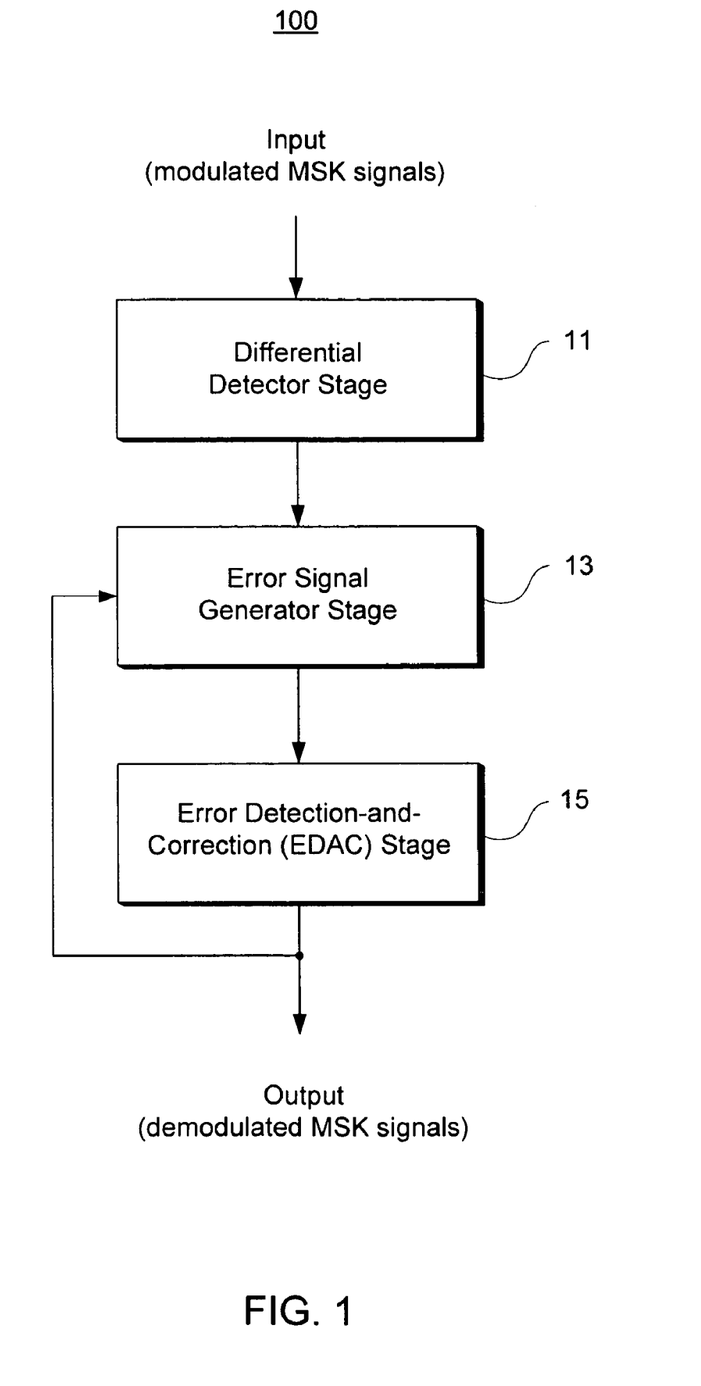
FIG. 1 is a top-level block diagram of one embodiment of a non-redundant double-error correcting DMSK demodulator according to the present invention.

FIGS. 1 through 4 illustrate the operation of one embodiment of a non-redundant double-error correcting DMSK demodulator according to the present invention. FIG. 1 shows, in a conceptual sense, three functional stages in a non-redundant double-error correcting DMSK demodulator 100. These are a differential detector stage 11, an error signal generator stage 13, and an EDAC stage 15.

Figure 2:
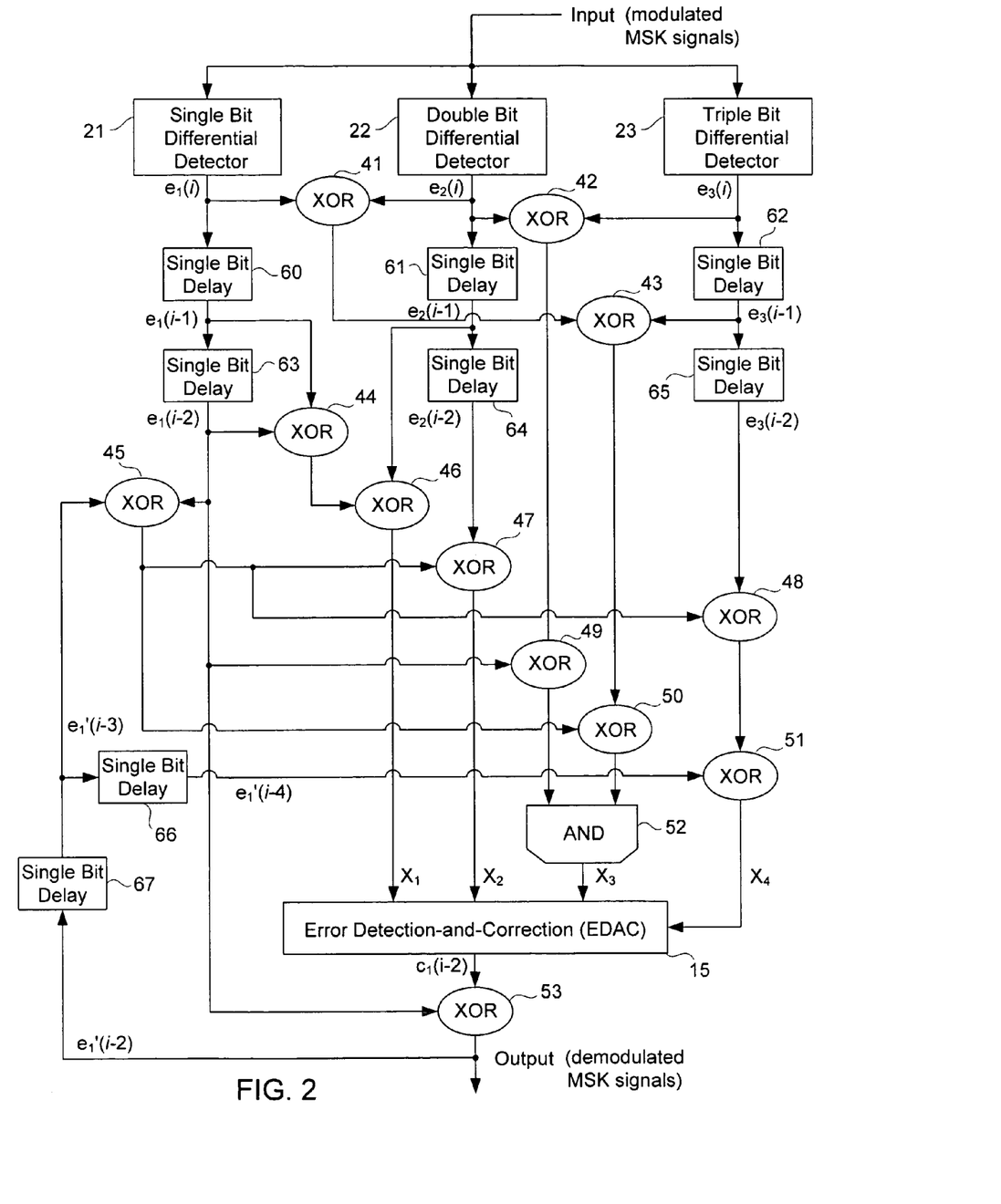
FIG. 2 is a block diagram of an embodiment of a non-redundant double-error correcting DMSK demodulator according to the invention.

The first stage is differential detector 11. In this stage, demodulator 100 receives the modulated MSK signals. As shown in the example of FIG. 2, differential detector 11 may include three such k-order detectors: a first order or single-bit differential detector 21, a second order or double-bit differential detector 22, and a third order or triple-bit differential detector 23. The operation of any of these k-order differential detectors (for k=1, 2, 3) is depicted in the block diagram of FIG. 3. Each k-order differential detector may include: a delay line 25 having a delay of kT, where k is the number of delayed bits, and where T is bit duration; a cosine phase comparator (PC) 27; and a discriminator 29.

Figure 3:
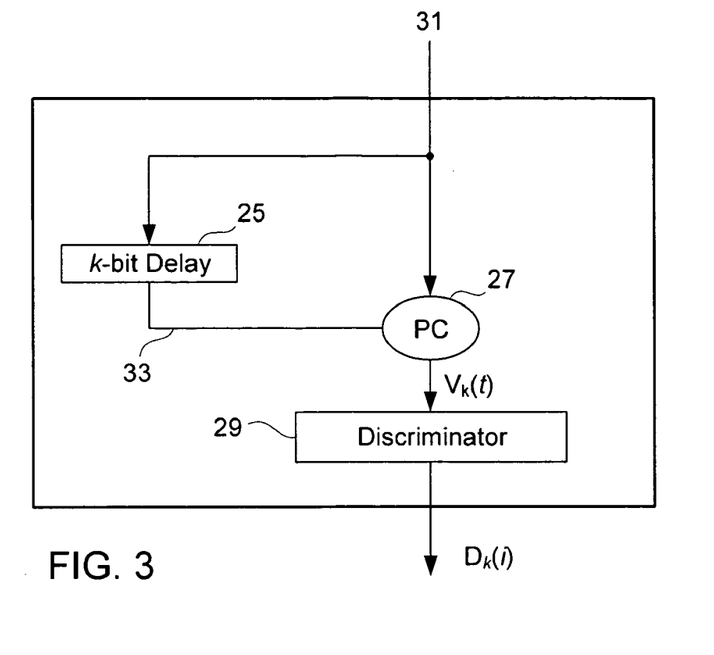
FIG. 3 is a block diagram of a k order DMSK detector (k=1, 2, 3) according to one embodiment of the invention.
Figure 4:
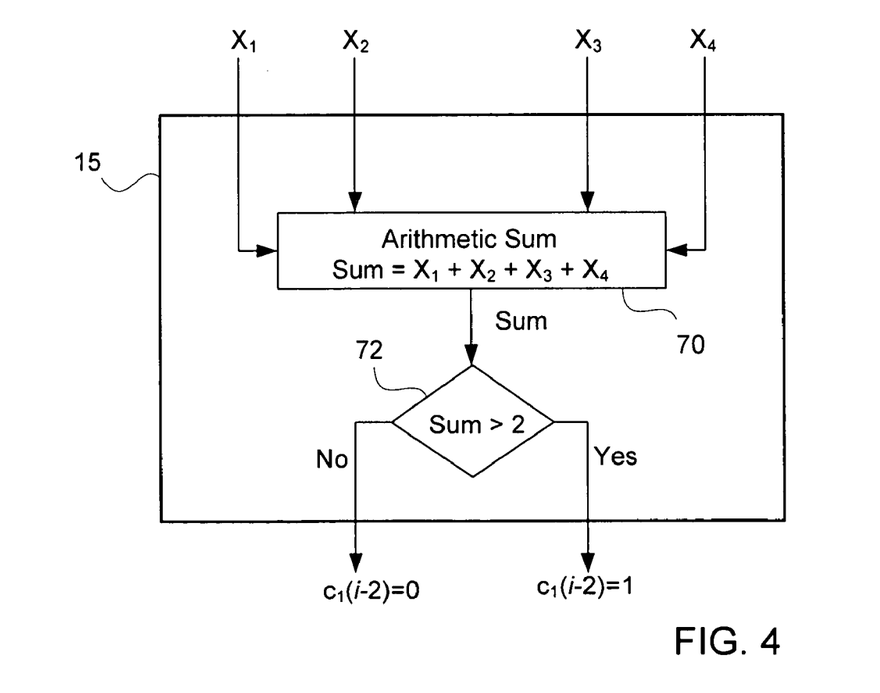
FIG. 4 is a block diagram of an error detection-and-correction (EDAC) unit according to one embodiment of the invention.

PC 27 mixes two signals: a direct received signal 31 and a delay signal 33. Delay signal 33 is the output of k-bit delay 25. The output of PC 27 is a signal $V_k(t)$. When the decision instant occurs at the end of the signaling interval, $V_k(t)$ at the arbitrary $i^{th}$ decision instant, in the absence of error, is given by $$V_k((i+1)T) = -\cos\left\{\frac{k\pi}{2} + \frac{\pi}{2}\sum_{j=0}^{k-1} d(i-j)\right\} \quad (1)$$

where d(i) is either "+1" or "−1" depending on whether the transmitted data are "1" or "0".

The signal $V_k(t)$ is input to discriminator 29. The logic of discriminator 29 yields a "1" when $V_k(t)$ is positive, and it yields a "0" when $V_k(t)$ is negative. Accordingly, the output $D_k(i)$ of the k-order detector at the instant i in the absence of error can be written as $$\tilde{D}_k(i) = \sum_{j=0}^{k-1} d(i-j) \quad (2)$$

The next stage in demodulator 100 is the error signal generator 13. This stage replaces the syndrome generator stage and the syndrome register stage of the Masamura demodulator. Recall that in the Masamura demodulator, the outputs of the differential detectors are used in constructing two syndrome values and propagating those syndrome values across the syndrome register to construct a six element syndrome matrix for calculating error patterns.

In error signal generator 13, rather than constructing a syndrome matrix, demodulator 100 may use the outputs of the k-order differential detectors to construct four error signals of the form $X_i$, where i=1, 2, 3 or 4. These four signals have the following two characteristics that facilitate the error detection process:

(1) the four error signals are orthogonal for the erroneous bit to be corrected; and (2) each of all other erroneous bits appears only once in all four error signals.

As shown in FIG. 2, the error signals $X_i$ may be generated directly from the outputs of the corresponding k-order detectors 21, 22 and 23. This advantageously reduces the probability of error propagation.

The next stage in demodulator 100 is EDAC 15. EDAC 15 receives the four error signals $X_i$ from the output of error signal generator 13, and sums them algebraically. This operation is depicted in the block diagram of FIG. 4, which shows each of the error signals $X_1$, $X_2$, $X_3$ and $X_4$ as input to a summing module 70. The resulting sum from summing module 70 is compared to a threshold value in comparator module 72. In one embodiment, if the resulting sum is higher than a threshold value of two, the output of EDAC 15, denoted $c_1(i-2)$, assumes a value of "1" to the error under consideration. Otherwise, EDAC 15 assumes a value of "0" for $c_1(i-2)$.

As shown in FIG. 2, the output stage of a demodulator according to the invention may be an Exclusive-OR operation at XOR 53. In this operation, inputs to XOR 53 are provided from the direct output $c_1(i-2)$ of EDAC 15, and from output $e_1(i-2)$ of single bit delay 63. Demodulator output is thus derived from the output of the first order differential detector 21 delayed by a two-bit duration, $e_1(i-2)$, and from the output $c_1(i-2)$ of EDAC 15, thereby yielding the corrected, demodulated output data $e_1'(i-2)$. Demodulator output $e_1'(i-2)$ may also be sent back to the signal error generator 13 to complete the generation of error signals $X_2$, $X_3$ and $X_4$, as shown, and as discussed in further detail below. In one embodiment, the output stage at XOR 53 may be integral to EDAC stage 15.

To demonstrate the advantages of a demodulator according to the present invention over double-error correcting DMSK demodulators such as the Masamura demodulator, a comparison of error detection techniques is now provided. Consider the outputs of differential detectors 21, 22 and 23. At an arbitrary instant i, each of these outputs has the form $D_k(i)$ (for k=1, 2, 3). According to equation (2), these outputs may be written as:

$$D_1(i)=d(i) \oplus e_1(i)$$

$$D_2(i)=d(i) \oplus d(i-1) \oplus e_2(i)$$

$$D_3(i)=d(i) \oplus d(i-1) \oplus d(i-2) \oplus e_3(i) \quad (3)$$

In equation set (3), $e_k(i)$ (for k=1, 2, 3) represents an error symbol having a value of "1" when an error exists, and having a value of "0" otherwise. In addition, $\oplus$ is the Exclusive-OR (XOR) operator which yields a value of "0" when its inputs are similar and yields a value of "1" otherwise. In the absence of error, equation set (3) reduces to:

$$\tilde{D}_1(i)=d(i)$$

$$\tilde{D}_2(i)=d(i) \oplus d(i-1)$$

$$\tilde{D}_3(i)=d(i) \oplus d(i-1) \oplus d(i-2) \quad (4)$$

Equation set (4) indicates that in the absence of error the outputs $D_1(i)$ of the first order differential detector correspond to the modulated data, and outputs $D_2(i)$, $D_3(i)$ of the second order and the third order differential detectors are representative of the parity check sum of two and three successive transmitted data bits, respectively.

For comparison purposes, two syndrome values $S_1(i)$ and $S_2(i)$ are now constructed by combining the outputs $D_1(i)$ of the first order differential detector with outputs $D_2(i)$, $D_3(i)$ of the second order differential detector and third order differential detector, respectively, at the moment i:

$$S_1(i)=D_1(i) \oplus D_1(i-1) \oplus D_2(i)$$

$$S_2(i)=D_1(i) \oplus D_1(i-1) \oplus D_1(i-2) \oplus D_3(i) \quad (5)$$

Introducing equations sets (3)-(4) into equation set (5) yields:

$$S_1(i)=(\tilde{D}_1(i) \oplus \tilde{D}_1(i-1) \oplus \tilde{D}_2(i)) \oplus (e_1(i) \oplus e_1(i-1) \oplus e_2(i)) \quad (6)$$

$$S_2(i)=(\tilde{D}_1(i) \oplus \tilde{D}_1(i-1) \oplus \tilde{D}_1(i-2) \oplus \tilde{D}_3(i)) \oplus (e_1(i) \oplus e_1(i-1) \oplus e_1(i-2) \oplus e_3(i)) \quad (7)$$

According to equation set (4), the quantities in the first brackets of equations (6) and (7) vanish, leading to:

$$S_1(i)=e_1(i) \oplus e_1(i-1) \oplus e_2(i) \quad (8)$$

$$S_2(i)=e_1(i) \oplus e_1(i-1) \oplus e_1(i-2) \oplus e_3(i) \quad (9)$$

From equations (8) and (9), it can be clearly seen that values of syndromes are determined only by the error symbols and not by the modulated digital data.

To correct for $e_1(i-2)$, the syndromes $S_1(i)$ and $S_2(i)$ from equation sets (8) and (9) are used along with their values at two preceding consecutive moments: (i-1) and (i-2), yielding:

$$S_1(i-1)=e_1(i-1) \oplus e_1(i-2) \oplus e_2(i-1) \quad (10)$$

$$S_1(i-2)=e_1(i-2) \oplus e_1'(i-3) \oplus e_2(i-2) \quad (11)$$

$$S_2(i-1)=e_1(i-1) \oplus e_1(i-2) \oplus e_1'(i-3) \oplus e_3(i-1) \quad (12)$$

$$S_2(i-2)=e_1(i-2) \oplus e_1'(i-3) \oplus e_1'(i-4) \oplus e_3(i-2) \quad (13)$$

In equations (11)-(13), $e_1'(i-3)$ and $e_1'(i-4)$ are obtained through delaying the demodulator output $e_1'(i-2)$ by T and 2T, respectively. The prime ' in equations (10)-(13) are placed over erroneous bits which have been already corrected by the demodulator.

Equations (8)-(13) are the equations used in constructing conventional double-error correcting demodulators, such as the Masamura demodulator. Those demodulators focus on correcting $e_1(i-2)$. By inspection, equations (8)-(13) are clearly not orthogonal for $e_1(i-2)$, that is, $e_1(i-2)$ does not appear in all equations (8)-(13). Also, any error of the other errors, $e_1(i)$, $e_1(i-1)$, $e_2(i)$, $e_2(i-1)$, $e_2(i-2)$, $e_3(i)$, $e_3(i-1)$ and $e_3(i-2)$, may appear in more than one of equations (8)-(13). These characteristics—non-orthogonality, and erroneous bits appearing more than once among all error signals—make it difficult to find simple criteria for detecting the error $e_1(i-2)$. Accordingly, in conventional demodulators such as the Masumara demodulator, error patterns were predetermined and stored in memory to be used in algorithms for detecting the error $e_1(i-2)$.

In the present invention, the syndrome equations are transformed to be made orthogonal for $e_1(i-2)$, and to ensure that an uncorrected error other than $e_1(i-2)$ appears only once. In doing so, equations (10), (11) and (13) are kept unchanged and equation (8) is added to both equation (9) and equation (12) through XOR gates. Then, the resultants are delivered to an AND gate (·) yielding $$S_1(i-1)=e_1(i-1) \oplus e_1(i-2) e_2(i-1)$$

$$S_1(i-2)=e_1(i-2) \oplus e_1'(i-3) \oplus e_2(i-2)$$

$$[S_1(i) \oplus S_2(i)] \cdot [S_1(i) \oplus S_2(i-1)]=[e_1(i-2) \oplus e_2(i) \oplus e_3(i)] \cdot [e_1(i) \oplus e_1(i-2) \oplus e_1'(i-3) \oplus e_2(i) \oplus e_3(i-1)]$$

$$S_2(i-2)=e_1(i-2) \oplus e_1'(i-3) \oplus e_1'(i-4) \oplus e_3(i-2) \quad (14)$$

The AND gate (·) outputs a value of "1" only when all of its inputs are "1", and it outputs a value of "0" otherwise. An examination of equation set (14) indicates that they are orthogonal for $e_1(i-2)$, and that any error of the errors $e_1(i)$, $e_1(i-1)$, $e_2(i)$, $e_2(i-1)$, $e_2(i-2)$, $e_3(i)$, $e_3(i-1)$ and $e_3(i-2)$ appears only once in equation set (14). Accordingly, the equations of equation set (14) are implemented in the logic design of the present demodulator, as shown, for example, in the embodiment of FIG. 2.

In implementing equation set (14), each equation therein is considered as an error signal $X_i$ (for i=1, 2, 3, 4) that may be generated directly from the outputs $e_1(i)$, $e_2(i)$ and $e_3(i)$ of the differential detectors 21, 22 and 23, respectively. For example, an equation for error signal $X_1$ may be derived from FIG. 2 by tracing the logic path leading up to the $X_1$ input to EDAC 15. The $X_1$ input is the output of XOR 46. The output of XOR 46 is the Exclusive-OR of the output of XOR 44 and the output $e_2(i-1)$ from single bit delay 61. The output of XOR 44 is the Exclusive-OR of output $e_1(i-2)$ from single bit delay 63 and output $e_1(i-1)$ from single bit delay 60. Thus, $X_1$ may be written as:

$$X_1 = e_1(i-1) \oplus e_1(i-2) \oplus e_2(i-1) \quad (15)$$

Similarly, an equation for error signal $X_2$ may be derived from the output of XOR 47, which is the Exclusive-OR of output $e_2(i-2)$ from single bit delay 64 and the output of XOR 45. The output of XOR 45 is the Exclusive-OR of output $e_1(i-2)$ from single bit delay 63 and output $e_1'(i-3)$ from single bit delay 67. Thus, $X_2$ may be written as:

$$X_2 = e_1(i-2) \oplus e_1'(i-3) \oplus e_2(i-2) \quad (16)$$

An equation for error signal $X_3$ may be derived from the output of AND gate 52. That output is the Logical-And of the output of XOR 49 and the output of XOR 50. The output of XOR 49 is the Exclusive-OR of output $e_1(i-2)$ of single bit delay 63 and the output of XOR 42. The output of XOR 42 is the Exclusive-OR of output $e_2(i)$ and $e_3(i)$. The output of XOR 50 is the Exclusive-OR of the output of XOR 43 and the output of XOR 45. The output of XOR 43 is the Exclusive-OR of output $e_3(i-1)$ of single bit delay 62 and the output of XOR 41. The output of XOR 41 is output $e_1(i)$ of detector 21 and output $e_2(i)$ of detector 22. The output of XOR 45 is the Exclusive-OR of output $e_1(i-2)$ of single bit delay 63 and output $e_1'(i-3)$ of single bit delay 67. Thus, $X_3$ may be written as:

$$X_3 = [e_1(i-2) \oplus e_2(i) \oplus e_3(i)] \cdot [e_1(i) \oplus e_1(i-2) \oplus e_1(i-3) \oplus e_2(i) \oplus e_3(i-1)] \quad (17)$$

Finally, an equation for error signal $X_4$ may be derived from the output of XOR 51, which is the Exclusive-OR of output $e_1'(i-4)$ of single bit delay 66 and the output of XOR 48. The output of XOR 48 is the Exclusive-OR of output $e_3(i-2)$ of single bit delay 65 and the output of XOR 45 (as recited above). Thus, $X_4$ may be written as:

$$X_4 = e_1(i-2) \oplus e_1'(i-3) \oplus e_1'(i-4) \oplus e_3(i-2) \quad (18)$$

In the above error signals $X_i$ in equations (15)-(18), if only $e_1(i-2)$ has a value of 1, each error signal will be equal to 1, and the sum of the four error signals will be equal to 4. If $e_1(i-2)$ is equal to 1 and an additional error of the other errors $e_1(i)$, $e_1(i-1)$, $e_2(i)$, $e_2(i-1)$, $e_2(i-2)$, $e_3(i)$, $e_3(i-1)$, and $e_3(i-2)$ is also equal to 1, one of error signals $X_i$ will be equal to zero, and the sum of error signals $X_i$ in equations (15)-(18) will reduce to 3. This determines the threshold level employed by EDAC 15 for detecting and correcting single and double errors.

The demodulator described above as illustrated in FIGS. 1-4 may also be embodied as a non-redundant differential double-error correcting MSK demodulation method. One embodiment of this method is method 500, illustrated in the process flow diagram of FIG. 5. Method 500 begins at step 502, in which modulated MSK input is received at a differential detection stage. In one embodiment, the modulated MSK input is received as common input to each of a plurality of differential detectors. In one implementation, the plurality of differential detectors includes a first order differential detector, a second order differential detector, and a third order differential detector. In the next step 504, output from the differential detection stage is converted into orthogonal error signals. In one embodiment, this step may consist of converting three syndrome pairs derived from the output of the differential detectors into four orthogonal error signals.

Figure 5:
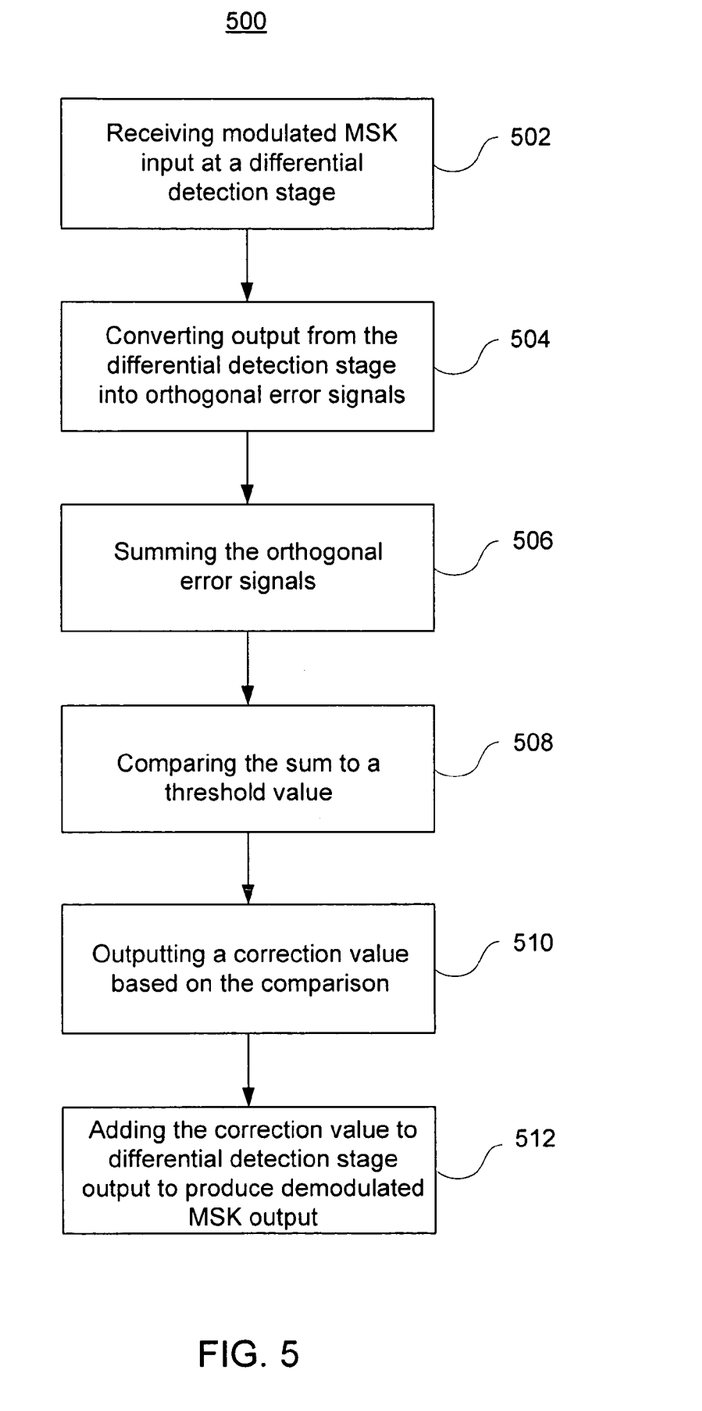
FIG. 5 is a process flow diagram of one embodiment of a non-redundant differential double-error correcting demodulation method according to the invention.

The next step in method 500 is step 506, which reflects the operation of EDAC stage 15. In this step, the orthogonal error signals are summed. Then, in step 508, the resulting sum is compared to a threshold value. In one embodiment, the threshold value is two. The next step is step 510. In step 510, a correction value is output based on the comparison performed in the previous step. In one embodiment, if the sum exceeds the threshold value, the resulting correction value output is a binary one. If, however, the sum does not exceed the threshold value, the resulting correction value output is a binary zero. The final step of this method is step 512, in which the correction value resulting from step 510 is added to output from the differential detection stage to produce demodulated MSK output. In one embodiment, the output from the differential detection stage that is added to the correction value is delayed by a two-bit duration.

In another embodiment of method 500, the converting step 504 uses feedback from the demodulated MSK output along with output from the differential detection stage to produce the orthogonal error signals.

Figure 6:
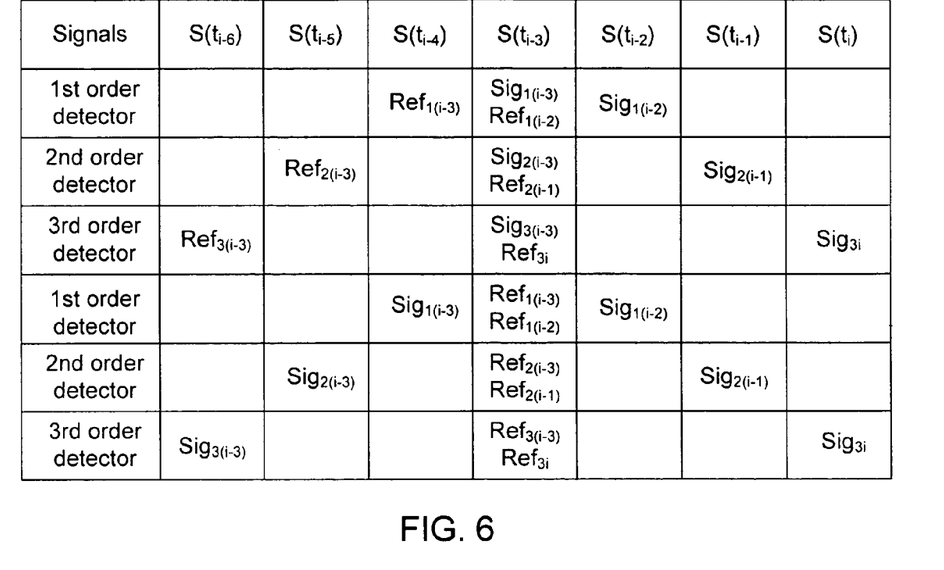
FIG. 6 is a table presenting the relation between signal and reference values employed in differential detection of MSK signals according to the present invention.

To demonstrate the error correcting capabilities of the present invention, the terms "signal" and "reference" employed in coherent detection of MSK signals is used herein. In differential detection, the received signal acts both as a "signal" and a "reference" simultaneously. The relation between "signal" and "reference" for the present demodulator is shown in the table of FIG. 6. In the table, the signal for the $k^{th}$ order detector (for k=1, 2, 3) at the $i^{th}$ decision instant $t_i$ is labeled $Sig_{ki}$ and the reference for the $k^{th}$ order detector is labeled $Ref_{ki}$. The table shows that the signal $S(t_{i-3})$ acts as $Sig_{1(i-3)}$, $Sig_{2(i-3)}$, $Sig_{3(i-3)}$, $Ref_{1(i-2)}$, $Ref_{2(i-1)}$, and $Ref_{3i}$ simultaneously.

Since the transmitted data are carried by the difference in the phase between two signaling intervals, labels Sig and Ref may be interchanged for any decision. Re-labeling between Sig and Ref in the table of FIG. 6, it is obvious that $S(t_{i-3})$ is used as a common reference for six outputs: $D_1(i-3)$, $D_1(i-2)$, $D_2(i-3)$, $D_2(i-1)$, $D_3(i-3)$, and $D_3(i)$. Therefore, the probability of multiple errors in any of these six outputs is much higher than that for the independent outputs.

Figure 7:
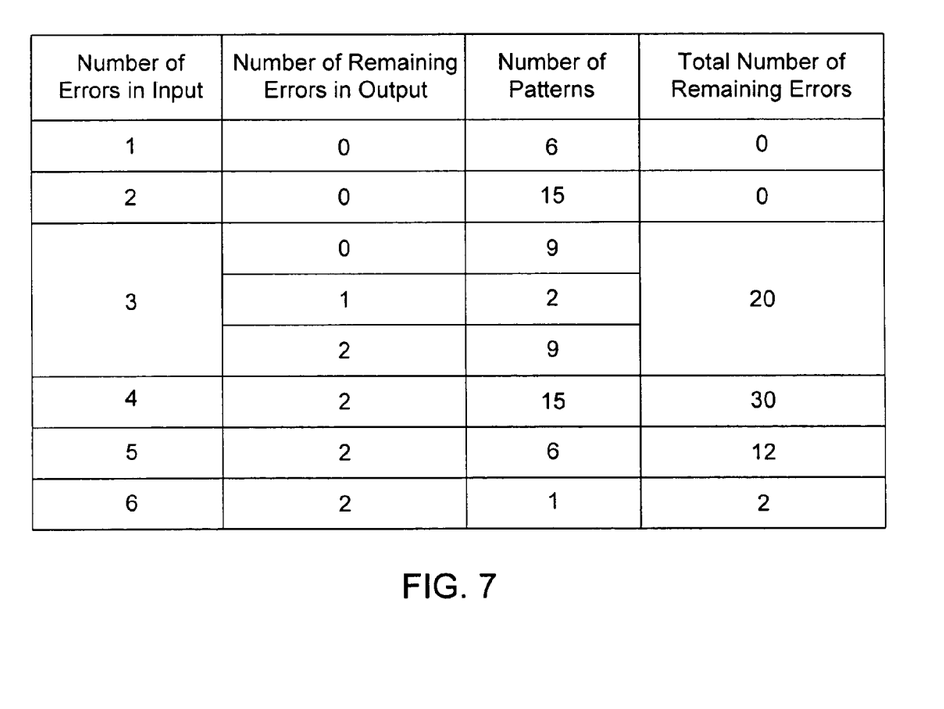
FIG. 7 is a table presenting for various error patterns the correcting capability of a non-redundant double-error correcting DMSK demodulator according to the present invention.

The table in FIG. 7 shows the number of error patterns which have errors in these six outputs and the number of remaining errors at the demodulator outputs. The table is obtained through introducing all error patterns that may be associated with the six outputs $D_1(i-3)$, $D_1(i-2)$, $D_2(i-3)$, $D_2(i-1)$, $D_3(i-3)$ and $D_3(i)$ into equations (15)-(18) and hence into EDAC 15. As shown in FIG. 7, there are six single error patterns (one out of six) and fifteen double error patterns (two out of 6) that may be associated with the six outputs $D_1(i-3)$, $D_1(i-2)$, $D_2(i-3)$, $D_2(i-1)$, $D_3(i-3)$ and $D_3(i)$. Those error patterns are totally corrected by the demodulator.

As for triple error patterns, they are twenty (three out of six) patterns. Only nine of the twenty patterns are corrected by the demodulator. Furthermore, from FIG. 7 also it is clear that the present demodulator is not capable of correcting other higher order error patterns, i.e. fourth, fifth, and sixth order error patterns. This is expected because the present demodulator has only up to double error correcting capability.

The BER performance of a demodulator according to the present invention was evaluated through testing. In the test, 40,000 digital bits were modulated using MSK modulation. The modulated bits were subjected to additive white Gaussian noise (AWGN), and the phases of the noisy modulated MSK bits were delivered to the demodulator input. Then the outputs of the demodulator were compared against the original non-modulated digital bits to calculate the BER values. The BER values along with their counterparts associated with the conventional DMSK demodulator and the single-error correcting demodulator are depicted as a function of signal to noise ratio (SNR) in FIG. 8.

Figure 8:
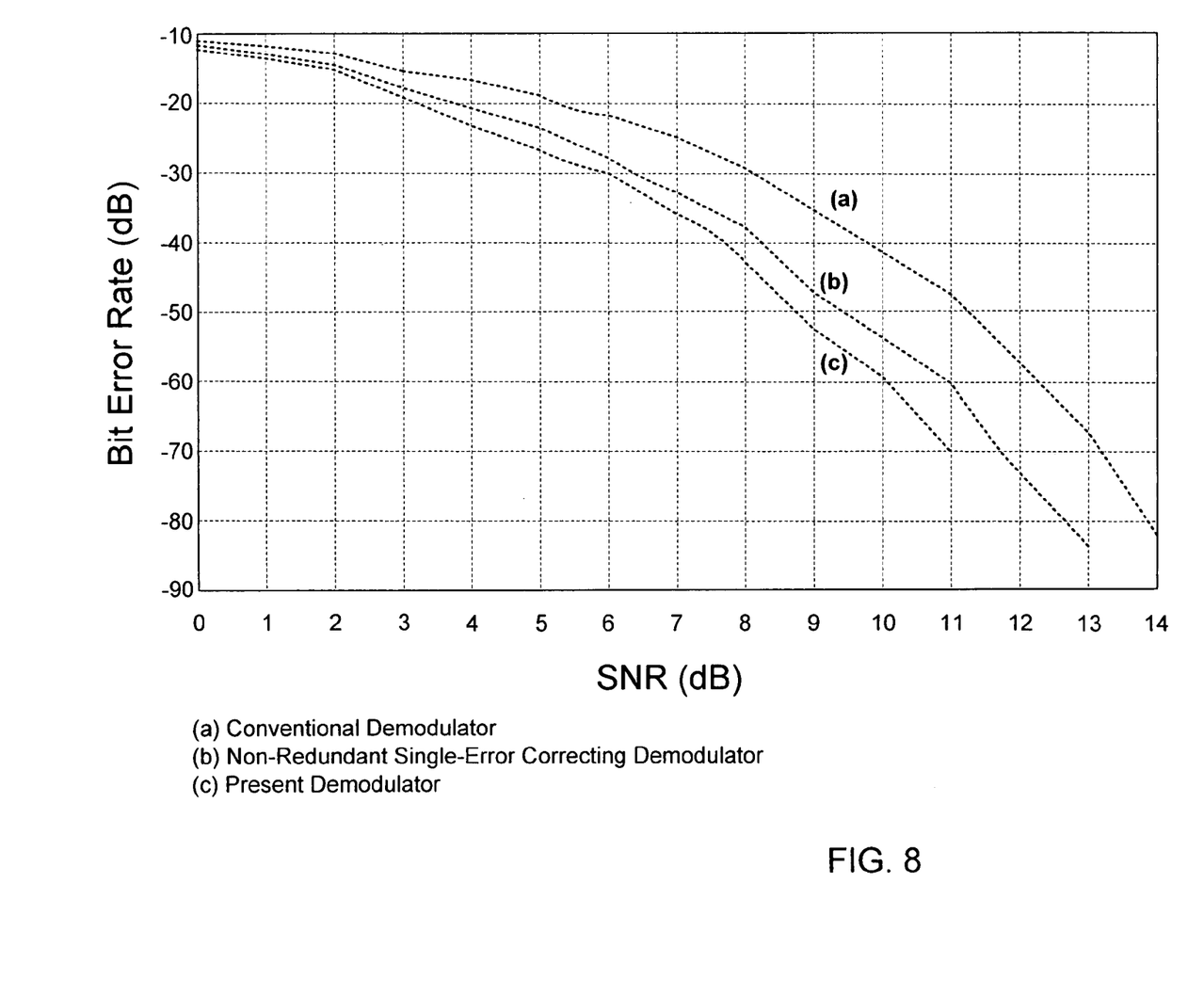
FIG. 8 is a graph depicting bit error rate (BER) as a function of signal-to-noise ratio (SNR) in (i) a conventional demodulator, (ii) a non-redundant single-error correcting demodulator, and (iii) a non-redundant double-error correcting DMSK demodulator according to the present invention.

FIG. 8 indicates that the BER performance of demodulator according to the present invention is superior to the BER performance of the single-error correcting demodulator, and hence, also to the BER performance of a conventional DMSK demodulator. This is clear from the SNR improvements offered by the present demodulator over both the single-error correcting demodulator and the conventional DMSK demodulator, because those improvements are a function of BER values.

For example, FIG. 8 shows that at a BER value of −20 dB, the present demodulator offers SNR improvements of 1.7 dB and 0.4 dB over the conventional DMSK demodulator and the single error correcting demodulator, respectively. At a BER value of −60 dB, the present demodulator yields a SNR improvement of 2.2 dB over the conventional DMSK demodulator, and a SNR improvement of 0.9 dB over the single-error correcting demodulator.

It is worth noting that the 0.9 dB SNR improvement offered by the present demodulator over the single-error correcting demodulator at the BER value of −60 dB is the maximum improvement that could be offered by the present demodulator over the non-redundant single-error correcting demodulator. On the other hand, the maximum SNR improvement that could be offered by the present demodulator over the conventional DMSK demodulator is on the order of 2.4 dB and it is offered at a BER value of −50 dB.

The invention has been disclosed in an illustrative style. Accordingly, the terminology employed throughout should be read in an exemplary rather than a limiting manner. Although minor modifications of the present invention will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. An error correcting demodulator, comprising:
    a differential detection stage receiving modulated MSK as an input and generating an output;
    an error signal generator stage receiving the output from the differential detection stage and converting it into orthogonal error signals; and
    an error detection-and-correction stage receiving the orthogonal error signals, summing the orthogonal error signals, comparing the sum to a threshold value to obtain a correction value, and adding the correction value to the output from the differential detection stage to produce demodulated MSK output.

2. The demodulator of claim 1 wherein the differential detection stage includes a first order differential detector, a second order differential detector, and a third order differential detector.

3. The demodulator of claim 2 wherein the orthogonal error signals are generated directly from the output of the differential detection stage.

4. The demodulator of claim 2 wherein the error detection-and-correction stage adds the correction value to output from the first order differential detector.

5. The demodulator of claim 4 wherein the output from the first order differential detector is delayed by a two-bit duration.

6. The demodulator of claim 1 wherein the error signal generator stage converts output from the differential detection stage into four orthogonal error signals.

7. The demodulator of claim 1 wherein, if the sum exceeds the threshold value, the error detection-and-correction stage outputs a binary one, otherwise the error detection-and-correction stage outputs a binary zero.

8. The demodulator of claim 1 wherein the threshold value is two.

9. The demodulator of claim 1 wherein the demodulated MSK output is fed back to the error signal generator stage.

10. An error correcting demodulator, comprising:
    a differential detection stage including a first order differential detector, a second order differential detector, and a third order differential detector, each differential detector receiving common modulated MSK input and generating a demodulated output;
    an error signal generator stage converting the output from the differential detectors into four orthogonal error signals;
    an error detection-and-correction stage summing the four orthogonal error signals, and comparing the sum to a threshold value to obtain a correction value; and
    an output stage receiving the correction value and adding the correction value to the output from the differential detection stage to produce demodulated MSK output.

11. The demodulator of claim 10 wherein, if the sum exceeds the threshold value, the error detection-and-correction stage outputs a binary one, otherwise the error detection-and-correction stage outputs a binary zero.

12. The demodulator of claim 10 wherein the demodulated MSK output is fed back to the error signal generator stage.

13. A method for error correcting during demodulation, steps of the method comprising:
    receiving modulated MSK input;
    differentially detecting the modulated MSK input;
    converting the differentially detected modulated MSK input into orthogonal error signals;
    summing the orthogonal error signals;
    comparing the sum to a threshold value to obtain a correction value; and
    adding the correction value to the differentially detected modulated MSK input to produce error corrected demodulated MSK signals.

14. The method of claim 13 wherein the receiving step includes receiving modulated MSK input at each of a first order differential detector, a second order differential detector, and a third order differential detector.

15. The method of claim 13 wherein the differentially detecting step includes differentially detecting the modulated MSK input through a first order differential detector, a second order differential detector, and a third order differential detector.

16. The method of claim 15 further comprising adding the correction value to output from the first order differential detector.

17. The method of claim 16 further comprising delaying by a two-bit duration the output from the first order differential detector added to the correction value.

18. The method of claim 13 wherein the converting step comprises converting the differentially detected modulated MSK input into four orthogonal signals.

19. The method of claim 13 further comprising, if the sum exceeds the threshold value, outputting a binary one as the correction value, otherwise outputting a binary zero as the correction value.

20. The method of claim 13 wherein the converting step further comprises converting the differentially detected modulated MSK input and feedback from the demodulated MSK into the orthogonal error signals.

* * * * *

UNITED STATES PATENT AND TRADEMARK OFFICE
CERTIFICATE OF CORRECTION

PATENT NO. : 7,593,487 B2  Page 1 of 1
APPLICATION NO. : 11/510054
DATED : September 22, 2009
INVENTOR(S) : Mostafa A. Karam It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 600 days.

Signed and Sealed this

Twenty-first Day of September, 2010

David J. Kappos
*Director of the United States Patent and Trademark Office*